United States Patent
Liu et al.

Patent Number: 6,108,412
Date of Patent: Aug. 22, 2000

[54] ADAPTIVE ECHO CANCELLING SYSTEM FOR TELEPHONY APPLICATIONS

[75] Inventors: Qing-Guang Liu, Verdun; Benoit Joseph Felix Champagne, Westmount, both of Canada

[73] Assignee: Nortel Networks Corporation, Montreal, Canada

[21] Appl. No.: 08/946,311

[22] Filed: Oct. 7, 1997

[51] Int. Cl.$^7$ ................................................ H04B 3/23

[52] U.S. Cl. .................... 379/410; 379/406; 379/409; 379/411; 370/288; 370/290

[58] Field of Search ................. 379/410, 411, 379/406, 407, 408, 409, 345; 370/286, 287, 289, 288, 290; 364/724.19; 708/322

[56] References Cited

U.S. PATENT DOCUMENTS

| | | | |
|---|---|---|---|
| 4,918,727 | 4/1990 | Rohrs et al. | 379/410 |
| 5,274,705 | 12/1993 | Younce et al. | 379/410 |
| 5,283,784 | 2/1994 | Genter | 379/410 |
| 5,463,618 | 10/1995 | Furukawa et al. | 379/410 |
| 5,475,731 | 12/1995 | Rasmusson | 379/406 |
| 5,559,881 | 9/1996 | Sih | 379/410 |
| 5,563,944 | 10/1996 | Hasegawa | 379/410 |
| 5,631,899 | 5/1997 | Duttweiler | 379/411 |
| 5,633,936 | 5/1997 | Oh | 379/410 |
| 5,644,635 | 7/1997 | Armbruster | 379/410 |
| 5,646,991 | 7/1997 | Sih | 379/410 |
| 5,663,955 | 9/1997 | Iyengar | 379/411 |
| 5,664,011 | 9/1997 | Crochiere et al. | 379/410 |
| 5,745,564 | 4/1998 | Meek | 379/406 |
| 5,761,638 | 6/1998 | Knittle et al. | 379/40 |
| 5,796,819 | 8/1998 | Romesburg | 379/406 |

OTHER PUBLICATIONS

Silencing Echoes on the Telephone Network, Man Mohan Sondi and David A berkley, Proceedings of the IEEE, vol. 68, No. 8, Aug. 1980, pp. 948–963.

Echo Cancellation in Speech and Data Transmission, David G. Messerschmitt, Fellow, IEEE, J. Selected Areas in comm., vol. SAC–2, No. 2, pp. 283–297, Mar. 1982.

Optimization of an Acoustic Echo Canceller Combined iwht Adaptive Gain Control, Peter Heitkamper, Proc. ICASSP '95, Detroit, USA, 1995, pp. 3047–3050.

Comparison of Three Post–Filtering Algorithms for Residual Acoustic Echo Reduction, Valerie Turbin, Andre Gilloire, Pascal Scalart, Proc. ICASSP '97, Munich, Germany, 1997, pp. 307–310.

Coupled Adaptive Filters For Acoustic Echo Control and Noise Reduction, R. Martin and J. Altenhoner, Proc. ICASSP '95 Detroit, USA 1995, pp. 3043–3046.

Echo Canceler with Two Echo Path Models, Kazuo Ochiai, Takashi Araseki and Takashi Ogihara, IEEE Transactions on Commuications, vol. Com–25, No. 6, Jun. 1977, pp. 589–595.

Implementation and Evaluation of an Acoustic Echo Canceller using the Duo–Filter Control System, Yoichi Haneda, Shoji Makino, Junji Kojima and Suehiro Shimauchi, Proc. International Workshop on Acoustic Echo and Noise Control Roros, Norway, 1995 pp. 79–82.

*Primary Examiner*—Forester W. Isen
*Assistant Examiner*—Jacques M. Saint-Surin

[57] ABSTRACT

This invention deals with an adaptive echo cancelling system for communication networks. The system includes an adaptive filter for acoustic echo cancellation that uses a combination of echo cancelling and gain control techniques. The main advantages of the combination of these approaches are good communication quality during double talk and easier control of the output echo level.

12 Claims, 4 Drawing Sheets

ADAPTIVE ECHO CANCELLING SYSTEM FOR TELEPHONY APPLICATIONS

FIELD OF THE INVENTION

The present invention relates to a method and a system for inhibiting echo in a communication line. The system is particularly useful for communication systems where an echo is susceptible to occur as a result of an acoustic feedback taking place at one end of the communication link (acoustical echo) or as a result of hybrid converters in the telecommunication network (electrical echo).

BACKGROUND OF THE INVENTION

In a typical telephone network, two types of echoes may be present: acoustical echo and electrical echo. Acoustical echo is susceptible to occur in a telecommunication network when a hands-free telephone terminal is used. The speech signal generated from the speaker in the terminal propagates in the form of an acoustic wave through an acoustic environment (air) and part of it will be fed back toward the microphone of the terminal. This signal will be transmitted back to the talker and therefore creates echo.

Electrical echo results from the presence of a hybrid converter that is required to connect the unidirectional four wire link from the public switched telephone network (PSTN) to the local two wire loop. The basic function of the hybrid converter is to separate the transmitted signal originating in the local loop from the received signal in the PSTN section, and vice versa. This process requires the energy of the received signal to pass fully in the local loop. However, due to an impedance mismatch in the hybrid converter, part of the received energy is reflected back to the transmitting port. As a result, a talker hears his own delayed speech which, of course, is undesirable.

The traditional approach for reduction of echo in communication networks is to use echo suppressors. A typical echo suppressor acts like a switch that monitors the voice signals travelling in both directions. It detects which person is talking and blocks the signal travelling in the opposite direction. The drawback of such echo suppressor is that they tend to "chop" speech signals when the subscribers talk back and forth quickly due to the response time for monitoring the speech activities. Moreover, during double talk, i.e., when the subscribers talk simultaneously, the suppressor fails to control the echo.

One possibility to avoid the problems of echo suppressor is to provide circuitry or an algorithm that, instead of blocking speech signals in one direction in the communication link, cancels the echo by using an adaptive filter. In essence, an adaptive echo canceller synthesises the echo that is then subtracted from the composite signal (speech signal plus echo signal). Residual echoes from this subtraction can still be at noticeable levels in a practical echo cancelling system because the adaptive filter may not be able to model perfectly the true echo path as a result of time-varying room impulse response, insufficient filter length, non-linear effects, finite precision computations, etc. Consequently, a non-linear processor, such as a centre clipper, is often used in an echo canceller for further reduction of the residual echo. However, improper design of such devices may cause speech clipping or introduce clipping sounds that interrupt the communication.

Thus, there exists a need in the industry to provide an improved echo canceller, particularly well suited for use during a communication session involving at least one hands-free telephone terminal or a communication network comprising a hybrid converter.

OBJECTIVES AND SUMMARY OF THE INVENTION

An object of this invention is to provide an improved method and apparatus for performing echo cancellation.

As embodied and broadly described herein, the invention provides an echo canceller for reducing the magnitude of an echo occurring in a return channel of a communication device, said echo canceller including:

first processing means for generating an echo estimate, said first processing means including a first input for receiving a signal that is a precursor of the echo in the return channel of the communication device;

second processing means in operative relationship with said first processing means, said second processing means being responsive to said echo estimate for conditioning a signal input in the return channel of the communication device to generate an output signal in which echo is inhibited;

third processing means for providing a second level echo attenuation, said third processing means including an output to generate an echo filtered signal generated in accordance with a certain transfer function, the signal input in the return channel of the communication device, in a state prior of being conditioned by said second processing means being a parameter of said transfer function.

The echo canceller system in accordance with the invention features a dual-stage echo cancellation strategy that is capable of significantly reducing the echo corruption in the signal propagating in the return channel of the communication system. In a preferred embodiment the first processing means of the echo canceller includes an adaptive filter that processes the signal on the forward channel (the signal precursor of the echo) to generate an echo estimate. That echo estimate is then subtracted from the signal on the return channel by a second processing means in the form of any suitable subtraction circuit. The resulting output signal, that constitutes an error signal, is then supplied to a normalised least mean square calculator that periodically computes new tap coefficient for the adaptive filter. The purpose of this feedback loop arrangement is to cause the adaptive filter to converge toward a minimal error condition, i.e., the synthesised echo signal is about the same as the true echo so as to remove the echo corruption as much as possible.

The output signal is then passed through a third processing means that refines the echo inhibiting process. In a specific embodiment, the third processing means includes an adaptive filter that receives the speech signal on the forward channel. A slow least mean square calculator updates the tap coefficients of the filter. The slow least means square calculator updates the coefficients on a basis of the output signal generated by the second processing means. In short, this arrangement amounts to effecting dual-stage filtration where the output signal can be viewed as a priori error of a filter while the output of the third processing stage is a posteriori error of the filter. It is known from theory that the a posteriori error of a filter is always less than the a priori error, thus this arrangement brings about an additional level of echo inhibition.

In a variant, the third processing means includes an adaptive gain controller that regulates the gain of the output signal for further reducing the echo therein. The level of signal attenuation is established on a basis of the power of the echo corrupted signal in the return channel of the communication device, and also by the power of the signal in the forward channel of the communication system. When there is no double talk, the gain controller reduces the magnitude of the output signal to further inhibit the echo. When local speech is present, in other words, the power in the signal in the return channel prior any echo removal is high, the gain of the controller is set to about 1. As a result, the output signal is not significantly affected. During a condition of double talk, the gain is also set to 1, i.e., the output signal is not attenuated. It should be noted that in this variant, the third processing means merely varies the magnitude of the output signal generated by the second processing means to provide echo reduction or filtering. More specifically, attenuating the entire signal at selected instants in time reduces echo. This is contrary to the first embodiment, where echo reduction is effected by filtering the echo corrupted signal as input in the return channel of the communication device to reduce echo with relation to other components of the signal.

As embodied and broadly described herein, the invention also provides a method for reducing a magnitude of an echo occurring in a return channel of a communication device, said method including the steps of:

a) generating an echo estimate, comprising the steps of:
providing a first signal that is a precursor of the echo in the return channel of the communication system;
processing said first signal to produce said echo estimate;

b) utilising said echo estimate for conditioning a signal propagating on the return channel of the communication device to generate an output signal in which echo is inhibited;

c) generating an echo filtered signal in accordance with a certain transfer function, the signal input in the return channel of the communication device, in a state prior of being conditioned by said second processing means being a parameter of said transfer function.

BRIEF DESCRIPTION OF THE DRAWINGS

FIG. 1b a variant of the embodiment shown in FIG. 1a;

DESCRIPTION OF A PREFERRED EMBODIMENT

The present invention provides an improved echo canceller system that is particularly well suited for u se in communications networks where an echo is susceptible to occur as a result of an acoustic feedback taking place at one end of the communication link (acoustical echo).

Figure 1A:
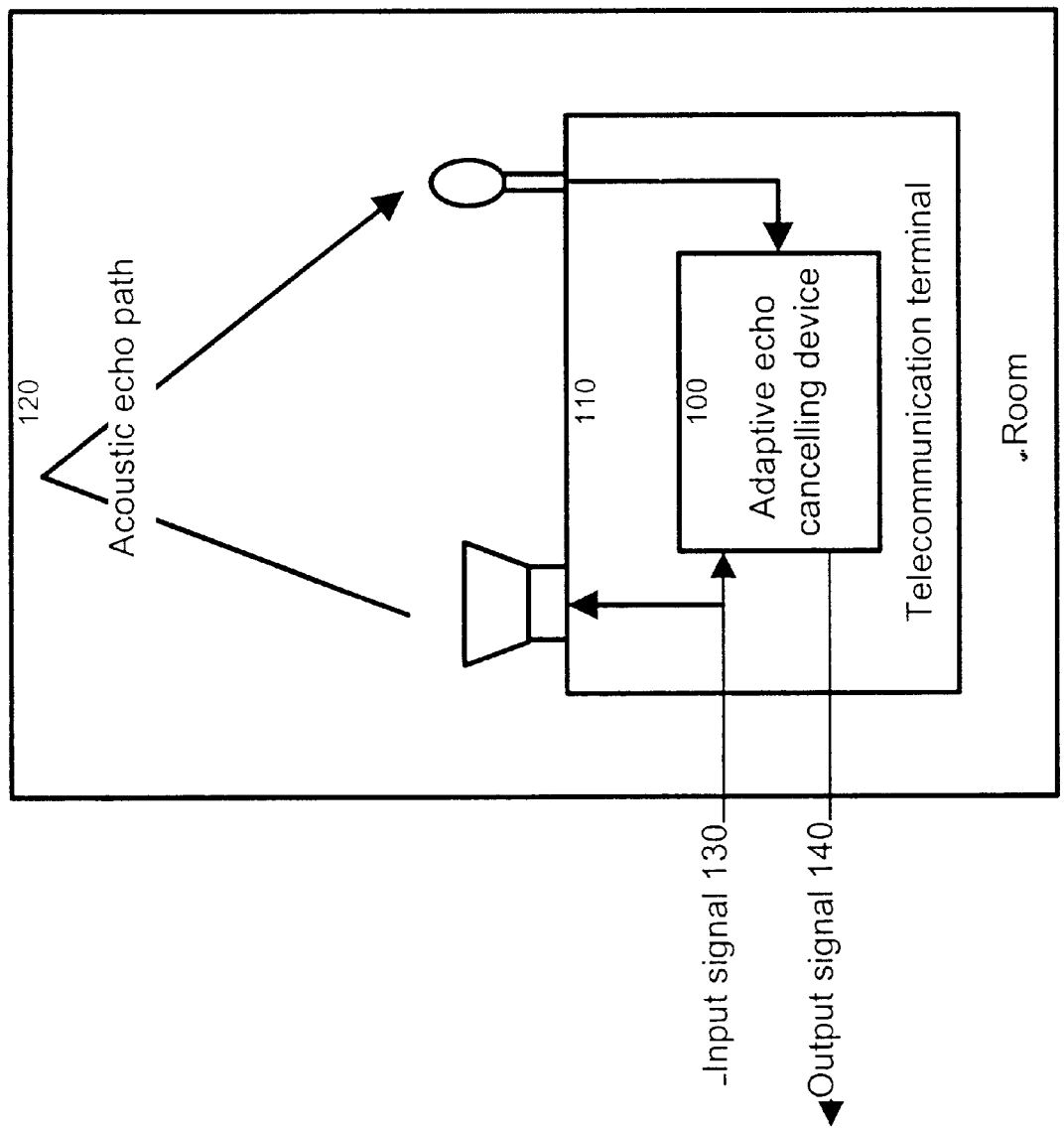
FIG. 1a is a block diagram of a hands-free telecommunication terminal featuring the novel echo cancelling device in accordance with the invention.

FIG. 1a illustrates a possible embodiment for the adaptive echo cancelling device. In this form of construction shows the adaptive echo cancelling device 100 is located within the telecommunication terminal 110. The telecommunication terminal 110 is placed in a room 120 were an acoustic echo path is present. The adaptive echo cancelling device 100 receives an input signal 130 from a far-end terminal. This signal 130 is also supplied to the loudspeaker output of the telecommunication terminal 110 in order that a user may hear the other party. The resulting sound wave that is generated by the loudspeaker will be reflected off the walls and other objects in the room 120 and picked up by the microphone and fed back to the telecommunication terminal 110. The microphone sends the signal to the adaptive echo cancelling device 100 which removes as much of the echo as possible and sends an output signal 140 to the far end terminal. Ideally, this signal should be echo free as much as possible.

Figure 1B:
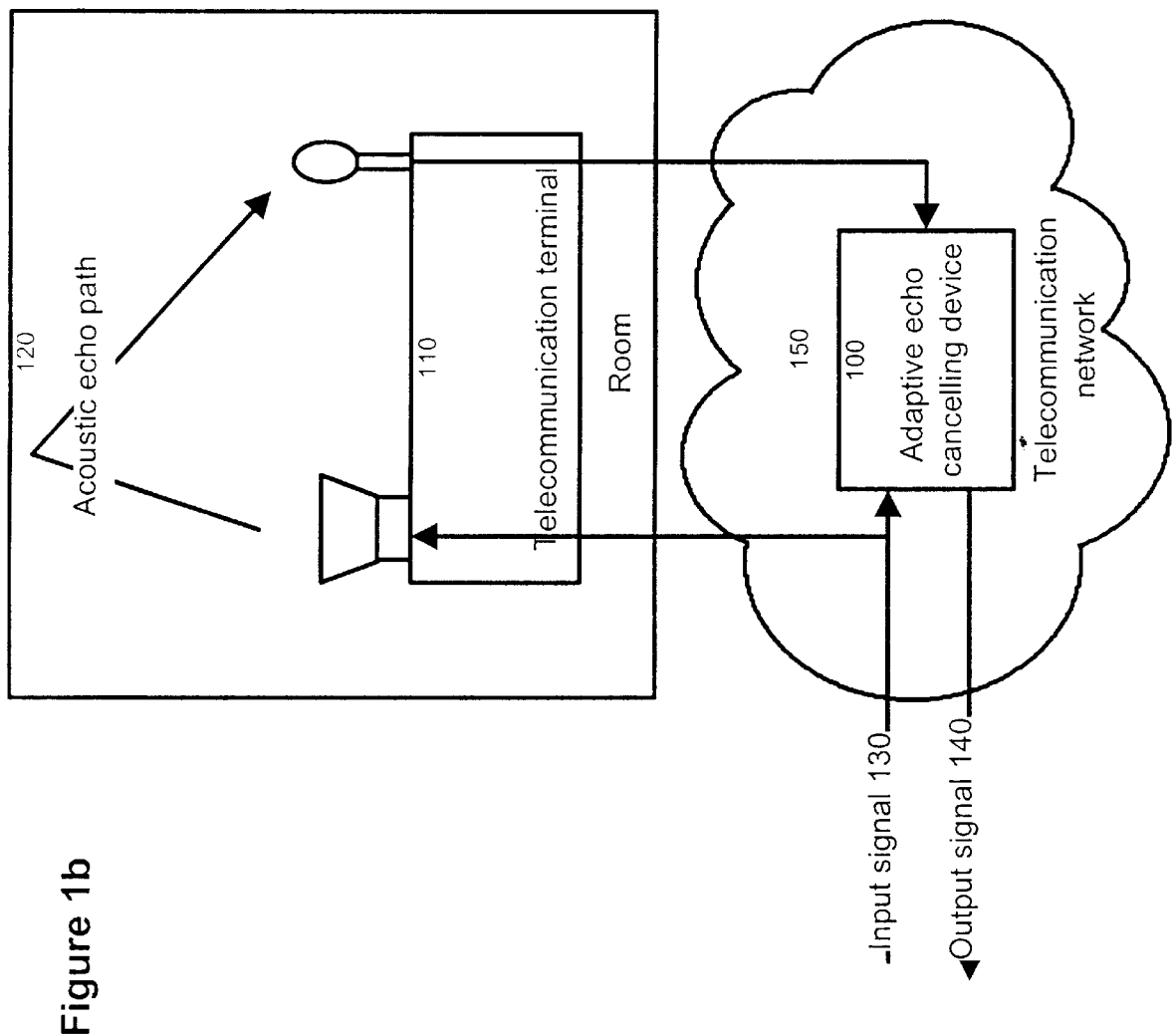

FIG. 1b illustrates another possible embodiment for the adaptive echo cancelling device. In this case, the echo canceller 100 is located within the telecommunication network 150, outside the telecommunication terminal 110. The signal path, however, is the same as described in FIG. 1a. The mode of construction shown at FIG. 1b may be preferable in some circumstances because one echo canceller 100 may be designed to service more than one voice channel. This results in a better utilization of resources by comparison to the embodiment depicted in FIG. 1a, where each telecommunication terminal is provided with a dedicated echo cancelling device 100.

Figure 2:
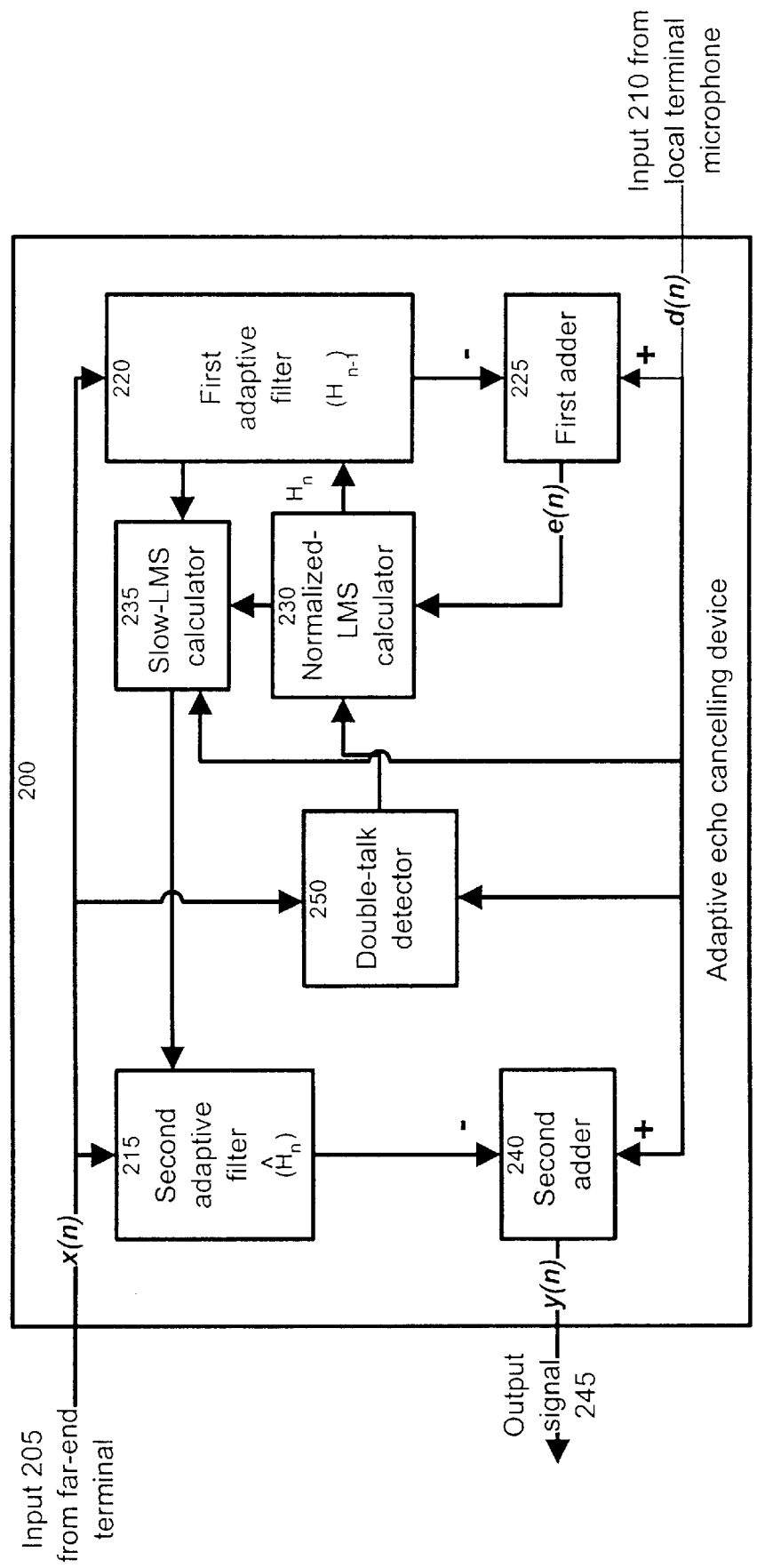
FIG. 2 is a block diagram of the adaptive echo cancelling device in accordance with the invention.

FIG. 2 shows a block diagram of the adaptive echo cancelling device 100 from FIG. 1. The adaptive echo cancelling device 200 is comprised of a first adaptive filter 220, a second adaptive filter 215, a first adder 225, a normalized-least mean square (LMS) calculator 230, a slow-LMS calculator 235, a second adder 240 and a double-talk detector 250. In this figure, the input 205 from the far-end terminal is the discrete-time signal used to drive the loudspeaker in FIGS. 1a and 1b and is the reference signal that will be used by the first adaptive filter 220, the second adaptive filter 215 and the double-talk detector 250. This signal is denoted x(n). A second input to the echo cancelling device 200 is denoted d(n) and is the signal picked up by the microphone in the room 120 as depicted in FIGS. 1a and 1b. The signal d(n) contains a portion of x(n) in the form of echo, background noise, and possibly, local speech.

The first adaptive filter 220, whose coefficient vector is denoted by $H_{n-1}$, is excited by x(n) and driven by the normalized-LMS algorithm to produce a replica of the echo signal. The residual signal e(n) (error signal) is then obtained by subtracting this replica of the echo signal from the input 210 d(n) and can be expressed as follows:

$$e(n) = d(n) - H^T_{n-1} X_n \qquad \text{Eq. 1}$$

where $X_n = [x(n), x(n-1), \ldots, x(n-(L-1))]T$ and L is the length or order of the adaptive filter.

By using the normalized-LMS algorithm calculator 230, the weight vector $H_n$ is updated as follows:

$$H_n = H_{n-1} + \Delta H_n \qquad \text{Eq. 2}$$

where $\Delta H_n$ is the modification vector to $H_{n-1}$ given by:

$$\Delta H_n = \frac{\mu_n}{\delta + \|X_n\|^2} e(n) X_n \qquad \text{Eq. 3}$$

where $\mu_n$ is the step size, $\delta$ is a small positive constant and $\|X_n\|^2 = X_n^T X_n$.

In practice, the step size $\mu_n$ is controlled by a double talk detector 250. It is set to 0 when local speech signal is present. This has the effect of temporarily disabling the adaptive function. Otherwise, $\mu_n$ is set to 1. The value of $\delta$ is calculated with:

$$\delta = 0.01 L \sigma_x^2 \qquad \text{Eq. 4}$$

where $\sigma_x^2$ is the a priori estimate of the average power of x(n).

Finally, the norm square $\|X_n\|^2$ of $X_n$, which is expressed as $\rho_x(n)$, can be recursively estimated as:

$$\rho_x(n)=(1-1/L)\rho_x(n-1)+|x(n)|^2 \qquad \text{Eq. 5}$$

Usually, the error signal e(n) still contains a certain amount of residual echo. Further processing of e(n) is therefore required before transmitting it over the network. In the present system, shown in FIG. 2, y(n) is the output signal transmitted over the network and it is calculated as described below.

The output signal 245 (y(n)) is produced by using another weight vector $\hat{H}_n$ as follows:

$$y(n)=d(n)-\hat{H}_n^T X_n \qquad \text{Eq. 6}$$

The new weight vector $\hat{H}_n$ is obtained in a similar manner as $H_n$ in equation 2:

$$\hat{H}_n = H_{n-1} + \beta_n \Delta H_n \qquad \text{Eq. 7}$$

where $0 < \beta_n \leq 1$.

The choice of value for $\beta_n$ is based on the short-time energy of the residual echo e(n) as calculated by the slow-LMS calculator 235. The short-time energy e(n) is normalized by a power estimate of the echo signal in d(n). The value $\beta_n$ is therefore calculated as follows:

$$\beta_n = \frac{1}{1+\gamma \varepsilon_e(n)/\sigma_d^2} \qquad \text{Eq. 8}$$

where γ is a constant (typical value is in the range 1 to 5), $\sigma_d^2$ is the average power of d(n) when there is no local speech and $\epsilon_e(n)$ is the short-time energy of the residual echo e(n), which is recursively estimated as:

$$\epsilon_e(n)=0.9\epsilon_e(n-1)+|e(n)|^2 \qquad \text{Eq. 9}$$

The output signal y(n) is therefore obtained by subtracting the output of the second adaptive filter 215 from the signal d(n) picked up by the microphone.

From the expression of $\Delta H_n$ in equation 3 it can be seen that the scalar $\beta_n$ in equation 7 serves only as a gain to the step size $\mu_n$. Since this gain is smaller than 1, equation 7 may be considered as a transfer function of a slow-LMS weight-updating calculator. The weight vector $\hat{H}_n$ obtained from equation 7 and the related output y(n) in equation 6 possesses the following properties:

a) When the normalized-LMS algorithm is in the state of updating ($\mu_n=1$) and there is no double talk, the residual echo e(n) is much lower (or becomes lower when tracking a time-varying echo path) than the echo level present in d(n). As a result, $\epsilon_e(n)/\sigma_d^2$ is (or tends to become) a very small number and then $\beta_n$ tends toward one from equation 8. Thus, $\hat{H}_n$ obtained from equation 7 is approximately equal to $H_n$ given by equation 2. Now, the difference between the residual echo e(n) in equation 1 and the output in equation 6 lies only in that the former is the a priori error of the adaptive filter while the latter represents the a posteriori error of the same adaptive filter. It is known from the adaptive filtering theory that the a posteriori error of an adaptive filter is always less than the a priori error. We thus have $|y(n)|<|e(n)|$. Accordingly, a reduction of the residual echo is obtained.

b) If double talk happens, there will be a relatively sudden signal energy increase in e(n). As a result the denominator of the right side of equation 8 will become much larger than 1. We thus get $\beta_n$ that tends toward 0 and further have $\hat{H}_n \approx H_{n-1}$ (see equation 7) and $y(n) \approx e(n)$. Thus, the local speech signal component contained in y(n) will be almost the same as that included in e(n). This means that no signal attenuation will occur by using the new weight vector $\hat{H}_n$.

c) During double talk, when the filter weight $H_m$ is frozen ($\mu_n=0$), $\hat{H}_n$ is also frozen and y(n) is exactly equal to e(n).

d) When x(n) corresponds to a silence, y(n)=d(n) from equation 6, i.e., the local speech is transmitted without distortion.

The adaptive echo canceling device 200 requires two sets of filtering processes resulting in an increase of the computational requirements. An equivalent implementation structure, which has almost the same complexity as a conventional normalized-LMS adaptive filter is shown in FIG. 3.

Figure 3:
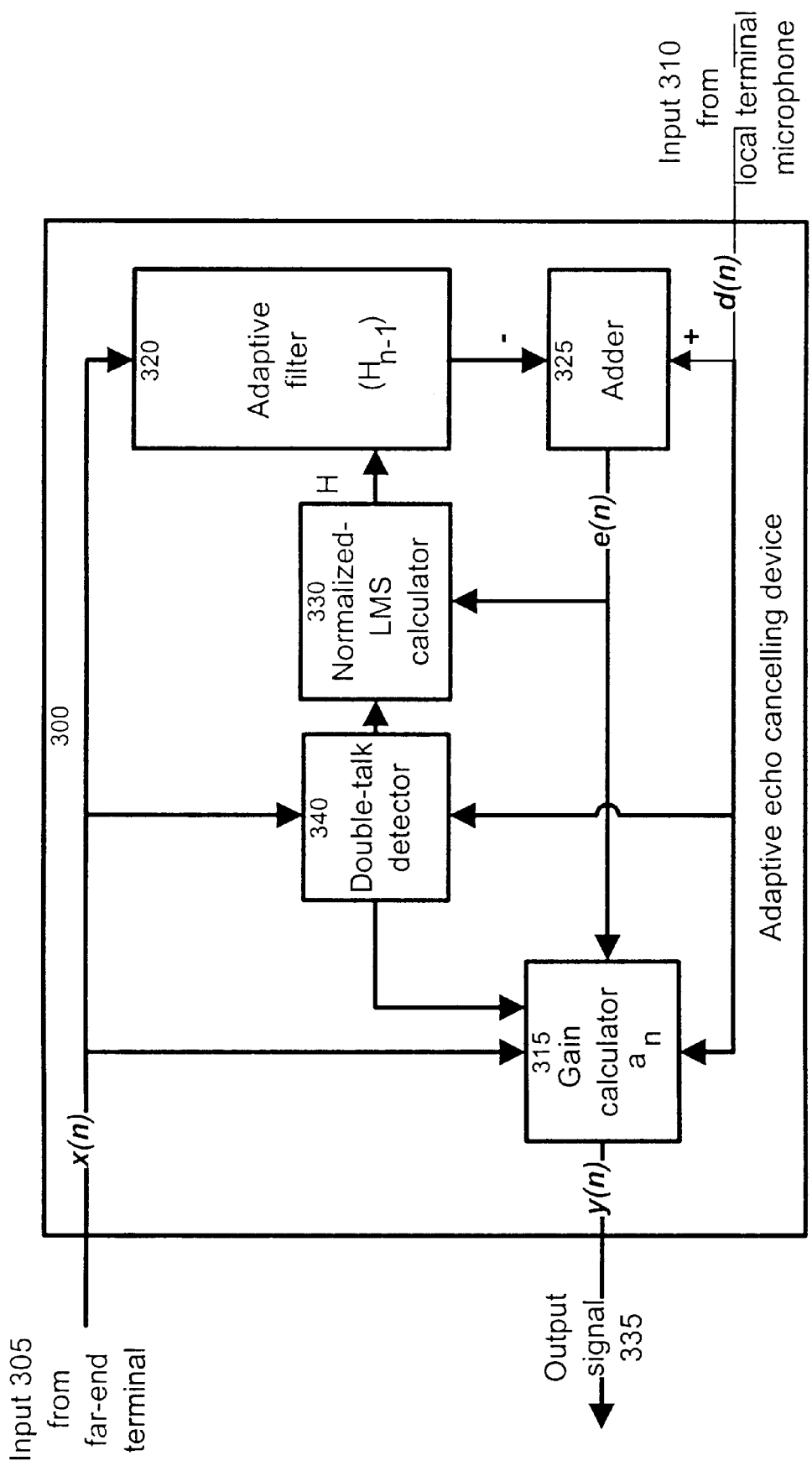
FIG. 3 is a block diagram of a variant of the echo cancellation device depicted in FIG. 2.

In FIG. 3, the adaptive echo cancelling device 300 is comprised of a gain calculator 315, an adaptive filter 320, an adder 325, a normalized-LMS calculator 330 and a double-talk detector 340. FIG. 3 shows two inputs, 305 and 310. Input 305 is the signal from the far-end terminal that will be supplied to the adaptive filter 320, the gain calculator 315 and the double-talk detector 340. Input 310 is the signal picked up by the local terminal microphone that will be input to the adder 325, the gain calculator 315 and the double-talk detector 340. The output signal 335 will be sent to the far-end terminal.

The calculations used to obtain the model for the adaptive echo cancelling device 300 are as follows. Substituting equation 7 into equation 6 and using the normalized-LMS updating equations 2 and 3, provides:

$$y(n)=\alpha_n e(n) \qquad \text{Eq. 10}$$

where $$\alpha_n = 1 - \beta_n \frac{\mu_n}{\delta + \|X_n\|^2} \cdot \|X_n\|^2 \qquad \text{Eq. 11}$$

Generally speaking, the gain $\alpha_n$ as shown in equation 11 is controlled by the energies of the input signal 305 x(n), the echo input signal 310 d(n) and the residual echo signal e(n), and, of course, the state of the double talk detector 340. In agreement with the properties a to d stated above, the gain $\alpha_n$ has the following properties:

a') When there is no double talk, $\mu_n$ is set to 1. In this case, as explained earlier, $\beta_n$ tends to 1. Then equation 11 gives $\alpha_n \approx 1 - \|X_n\|^2/(\delta+\|X_n\|^2)$. Thus, $\alpha_n$ becomes much smaller than one and according to equation 10, the residual echo e(n) is reduced by this gain in the output y(n). In the initial convergence process of the adaptive filter, $\beta_n$ in equation 8 gradually approaches 1 and $\alpha_n$ gradually reaches its minimal value. As a result, a faster reducing rate of the echoes in $y(n)=\alpha_n e(n)$ will be observed compared to that in e(n). This means that a faster convergence speed is obtained. Based on the same considerations, the observed tracking speed can also be increased by using y(n) instead of e(n) as the output.

b') When a local speech signal is present in d(n), $\beta_n$ tends to 0. Accordingly, one obtains $\alpha_n$ tends to one and $y(n) \approx e(n)$. Thus, the local speech will not be attenuated.

c') When the filter weight $H_n$ is frozen ($\mu_n=0$) during double talk, we have $\alpha_n=1$ and y(n)=e(n).

d') When x(n)=0, it results in $\alpha_n$ equal 1 and y(n)=d(n). This means that once the far-end is silent, the local signal is sent without any distortion.

We claim:

1. An echo canceller for reducing the magnitude of an echo occurring in a return channel of a communication device, said echo canceller comprising:
   a first processing unit for generating a first echo estimate, said first processing unit including a first input for receiving a signal that is a precursor of the echo in the return channel of the communication device;
   a second processing unit coupled to said first processing unit for receiving the first echo estimate, said second processing unit including an input for receiving a signal input in the return channel and that is potentially containing echo, said second processing unit being operative to generate an error signal indicative of how closely the first echo estimate models the echo in the return channel of the communication device;
   a third processing unit including an adaptive filter to generate a second echo estimate, said adaptive filter being characterized by a transfer function, said third processing unit comprising:
   a) a first input for receiving the signal that is the precursor of the echo;
   b) a second input for receiving an adaptation signal derived from said error signal, said adaptation signal causing the adaptive filter to alter the transfer function to reduce a difference between the second echo estimate and the echo in the return channel of the communication device;
   c) a third input for receiving the signal input in the return channel and that potentially contains echo, said third processing unit being operative to condition the signal input at said third input to generate an echo attenuated signal;
   d) an output for releasing the echo attenuated signal.

2. An echo canceller as defined in claim 1, wherein said adaptive filter is a second adaptive filter and wherein the transfer function is a second transfer function, said first processing unit including a first adaptive filter, said first adaptive filter being characterised by a first transfer function.

3. An echo canceller as defined in claim 2, wherein said second processing unit is an adder, said adder being operative to subtract the first echo estimate from the signal input in the return channel and that potentially contains echo to generate the error signal.

4. An echo canceller as defined in claim 3, wherein said first processing unit includes an updating unit for periodically updating the first transfer function characterizing said first adaptive filter to tend to reduce the error signal.

5. An echo canceller as defined in claim 4, wherein said updating unit updates the first transfer function on a basis of the error signal.

6. An echo canceller as defined in claim 5, wherein said updating unit comprises a normalized-least mean square calculator.

7. An echo canceller as defined in claim 5, wherein said first processing unit further includes a double-talk detector unit, said updating unit being responsive to said double-talk detector to selectively update the first transfer function.

8. An echo canceller as defined in claim 1, wherein said third processing unit being operative for subtracting the second echo estimate from the signal input in the return channel potentially containing echo.

9. An echo canceller as defined in claim 1, wherein said third processing unit is responsive to a condition of double talk to alter said transfer function.

10. A telephone comprising the echo canceller defined in claim 1.

11. A method for reducing the magnitude of an echo occurring in a return channel of a communication device, said method comprising:
   generating a first echo estimate, comprising the steps of:
   a) receiving a first signal that is a precursor of the echo in the return channel of the communication device;
   b) processing the signal to produce the first echo estimate;
   receiving a second signal input in the return channel of the communication device and that potentially contains echo;
   generating an error signal indicative of how closely the first echo estimate models the echo in the second signal input in the return channel of the communication device;
   processing the second signal input in the return channel of the communication device in a processing unit including an adaptive filer to generate an echo attenuated signal, said adaptive filter being characterized by a transfer function;
   using the error signal to alter said transfer function to increase attenuation of the echo contained in the second signal input in the return channel of the communication device;
   releasing the echo attenuated signal.

12. A method as defined in claim 11, further comprising subtracting the first echo estimate from the second signal input in the return channel and that potentially contains echo to generate the error signal.

* * * * *